(12) United States Patent
Spuller et al.

(10) Patent No.: US 12,145,125 B2
(45) Date of Patent: Nov. 19, 2024

(54) FILLING BODY

(71) Applicant: SGL CARBON SE, Wiesbaden (DE)

(72) Inventors: Ralph Spuller, Meitingen (DE);
Andreas Halbmeir, Meitingen (DE);
Stefan Fischer, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 374 days.

(21) Appl. No.: 15/734,719

(22) PCT Filed: Nov. 28, 2019

(86) PCT No.: PCT/EP2019/082916
§ 371 (c)(1),
(2) Date: Dec. 3, 2020

(87) PCT Pub. No.: WO2020/120151
PCT Pub. Date: Jun. 18, 2020

(65) Prior Publication Data
US 2021/0220799 A1 Jul. 22, 2021

(30) Foreign Application Priority Data
Dec. 13, 2018 (DE) .................... 10 2018 221 652.5

(51) Int. Cl.
*B01J 19/30* (2006.01)

(52) U.S. Cl.
CPC ...... *B01J 19/30* (2013.01); *B01J 2219/30296* (2013.01); *B01J 2219/30433* (2013.01); *B01J 2219/30483* (2013.01); *B01J 2219/3185* (2013.01)

(58) Field of Classification Search
CPC .............. B01J 19/30; B01J 2219/30296; B01J 2219/30433; B01J 2219/30483; B01J 2219/3185
USPC ............................................ 261/95, DIG. 72
See application file for complete search history.

(56) References Cited

U.S. PATENT DOCUMENTS

| | | | | |
|---|---|---|---|---|
| 3,311,356 A | * | 3/1967 | Eckert .................... | B01J 19/305 261/DIG. 72 |
| 4,041,113 A | * | 8/1977 | McKeown ............... | B01J 19/30 210/150 |
| 4,197,264 A | * | 4/1980 | Degg ..................... | B01D 3/328 138/116 |
| 4,303,599 A | * | 12/1981 | Strigle, Jr. ............... | B01J 19/30 261/DIG. 72 |

(Continued)

FOREIGN PATENT DOCUMENTS

| | | |
|---|---|---|
| CN | 2730471 Y | 10/2005 |
| DE | 41 04 447 A1 | 8/1992 |

(Continued)

OTHER PUBLICATIONS

English Abstract of FR 2913353 (Year: 2008).*
(Continued)

*Primary Examiner* — Charles S Bushey
(74) *Attorney, Agent, or Firm* — Maier & Maier, PLLC

(57) ABSTRACT

Filling bodies for the use in unstructured packings. The filling body has a fibre-reinforced carbon flat material. Two strip regions of the carbon flat material, which are separated by a cut, transition into two connecting regions of the carbon flat material.

18 Claims, 6 Drawing Sheets

(56) References Cited

U.S. PATENT DOCUMENTS

| | | | | |
|---|---|---|---|---|
| 4,333,892 | A | * | 6/1982 | Ellis .................. B01J 19/30 |
| | | | | 261/DIG. 72 |
| 4,575,435 | A | * | 3/1986 | Kuhl .................. B01J 19/30 |
| | | | | 261/DIG. 72 |
| 4,576,763 | A | * | 3/1986 | Nutter ................ B01J 19/30 |
| | | | | 96/290 |
| 5,112,536 | A | | 5/1992 | McNulty et al. |
| 5,225,575 | A | | 7/1993 | Ivanov et al. |
| 5,543,088 | A | * | 8/1996 | Halbirt ............... B01J 19/30 |
| | | | | 261/DIG. 72 |
| 5,578,255 | A | * | 11/1996 | Okuyama ........... F16D 69/023 |
| | | | | 526/341 |
| 5,882,772 | A | * | 3/1999 | Schultes ............. B01J 19/30 |
| | | | | 428/184 |
| 7,722,945 | B2 | * | 5/2010 | Nieuwoudt ......... B01J 19/30 |
| | | | | 428/174 |
| 8,646,758 | B2 | * | 2/2014 | Raynal ............... B01J 19/32 |
| | | | | 261/112.2 |
| 2015/0069663 | A1 | | 3/2015 | Ausner et al. |
| 2015/0336079 | A1 | * | 11/2015 | Xie .................... B01F 23/29 |
| | | | | 261/95 |

FOREIGN PATENT DOCUMENTS

| | | | |
|---|---|---|---|
| DE | 10 2006 028 407 B3 | | 3/2008 |
| EP | 0114897 A1 | * | 8/1984 |
| FR | 2 913 353 | * | 9/2008 |
| FR | 2913353 A1 | | 9/2008 |
| FR | 2995224 A1 | | 3/2014 |
| GB | 738 186 A | | 10/1955 |
| JP | S63-209744 A | | 8/1988 |

OTHER PUBLICATIONS

International Search Report issued on Jan. 24, 2020 in corresponding International application No. PCT/EP2019/082916; 4 pages.
Jäger et al., "Carbon fibres and their composites, manufacturing processes, applications and market development", Verlag Moderne Industrie, 2010; 39 pages.

* cited by examiner

FILLING BODY

FIELD

The invention relates to a filling body for use in unstructured packings, the filling body comprising a fibre-reinforced carbon flat material, a column having a packing comprising filling bodies according to the invention, and a method for producing filling bodies according to the invention.

BACKGROUND

Filling bodies are used in a wide range of chemical and/or thermal processes, especially in column packings.

In material separation columns, packings define separation zones, for example in absorption columns, desorption columns, distillation columns or extractive distillation columns.

In reaction columns, filling bodies are used in different portions of packings. Filling bodies are used, for example, in portions which are upstream or downstream of reaction zones and through which fluids containing reactant or product flow. Here, they can be used to supply or remove heat. Filling bodies are also used within reaction zones, with the filling bodies being either present together with catalytically active bodies, for example shaped catalyst bodies, and diluting the catalytically active bodies, or themselves serving as catalyst carriers if a catalytically active compound is attached to the filling body.

JP S 63209744 describes that filling bodies for columns can consist of different materials, for example porcelain, plastics, metal or carbon. Among others, Raschig rings, Lessing rings and Berl saddles are mentioned.

JP S 63209744 proposes a filling material for a device for contacting gas with liquid, which filling material is made of carbon-fibre-reinforced carbon. In this context, corrugated sheets, knitted wire meshes, honeycomb-like and similar filling materials are also described. The reinforcing carbon fibre can be chosen from continuous fibres and short fibres or can be used as sheets, for example as woven fabric, mat, felt or the like.

In JP S 63209744, various methods are proposed for producing the filling material proposed there. If the carbon fibre is a continuous fibre, it is first impregnated with a carbonisable substance, such as phenolic resin, furan resin, pitch or the like, and is then wound around a mandrel or the like to form the desired filling material. If the carbon fibre is a short fibre, a mixture of carbon fibre and the carbonisable material is injected, for example into the shape of a desired filling material. If the carbon fibre is in the form of a sheet, for example as a woven fabric, it is impregnated with said carbonisable substance and then rolled or laminated to obtain a desired filling form. Subsequently, it is to be carbonised at 600 to 2800° C. In addition, a machining process is proposed to obtain the desired form. In one example, the production of a Raschig ring starting from a prepreg is described.

The filling materials and filling bodies described in the prior art, which are made of carbon-fibre-reinforced carbon, can only be produced with great outlay.

SUMMARY

The object of the present invention is to provide a filling body which is particularly resistant to corrosion, can be produced with particularly low outlay and is able to withstand the usual mechanical load requirements, i.e. in particular the static pressure acting on the filling body in the lower region of a packing as a result of the filling bodies lying on top and the liquid flowing out.

This object is achieved by a filling body for use in unstructured packings, wherein the filling body comprises a fibre-reinforced carbon flat material and two strip regions of the carbon flat material, which are separated by a cut, transition into one another in two connecting regions of the carbon flat material.

The filling body according to the invention is suitable for use in unstructured packings, for example in unstructured packings which can (permanently) withstand halogen-containing fluids and hydrogen halide-containing fluids even in the presence of water at temperatures of more than 50° C. Unstructured packings are used, for example, in apparatuses from the field of chemical engineering, especially in columns such as absorption columns, desorption columns, distillation columns or extractive distillation columns.

The filling body according to the invention has a fibre-reinforced carbon flat material. Fibre-reinforced carbon flat materials are known to a person skilled in the art of carbon-based materials, for example from the book "Carbonfasern und ihre Verbundwerkstoffe, Herstellungsprozesse, Anwendungen und Marktentwicklung" ("Carbon fibres and their composites, manufacturing processes, applications and market development") by Hubert Jager and Tilo Hauke (Verlag Moderne Industrie, 2010, ISBN 978-3-86236-001-7). The fibre-reinforced carbon flat material can be formed from a prepreg by curing and carbonisation. A prepreg is a fibre strip impregnated with a matrix polymer (for example resin) but not yet cured, for example a carbon fibre strip or a two-dimensional industrial textile.

In the context of the present invention, a cut means a cut extending through the carbon flat material from one main surface to the other, with both ends of the cut being offset from the circumferential edge of the carbon flat material. The cut is therefore not an incision starting from an edge of the carbon flat material, nor is it a cut cutting the carbon flat material into two parts.

The cut defines two strip regions separated by the cut. The strip regions are adjacent to the cut.

The two strip regions of the carbon flat material transition into one another in two connecting regions of the carbon flat material. The connecting regions connect the strip regions because the two ends of the cut are offset from the edges of the carbon flat material.

Preferably, the connecting regions are spatially separated regions of the carbon flat material, which are connected by the strip regions.

The fibres can be short fibres, for example carbon-fibre short fibres. In the context of the present invention, short fibre means that the fibre is shorter than the shortest strip region. The length of the strip region is measured along the shortest cut. The fibres may also be continuous fibres, for example continuous carbon fibres. The continuous fibres extend, for example, from one point of the circumferential edge to another point of the circumferential edge of the carbon flat material.

The fibres, for example carbon fibres, can be arranged irregularly or regularly. Irregularly arranged fibres are present, for example, in a non-woven fabric. Fibre reinforcement according to the invention can be achieved, for example, by fibres present in non-woven form.

Preferably, at least part of the fibres running in at least one strip region extend into both connecting regions. This increases the stability of the filling body according to the invention, in particular tensile loads rarely lead to the strip regions being torn or torn off. Ultimately, greater packing heights can be achieved without significant damage to filling bodies in lower regions of the packing.

The number of cuts can be selected as desired. However, it is recommended not to increase the number of strip regions arbitrarily and to ensure that the strip regions are wide enough to withstand the requirements imposed by mechanical stresses arising in packings.

For example, the filling body can have 1 to 35 cuts, in particular 2 to 23 cuts, preferably 2 to 15 cuts, particularly preferably 2 to 11 cuts. A particularly preferred filling body according to the invention has 3 to 7, for example 3, 4 or 5 cuts.

It is preferable that all strip regions of the carbon flat material separated by the cuts transition into one another in only two connecting regions of the carbon flat material (for example, as in the case of the filling body shown in FIG. 1A to 1C, which has only the connecting regions provided with the reference signs 3 and 4). However, it is also possible that there are more than two connecting regions (for example, as in the case of the filling body shown in FIG. 5). A particularly preferred filling body has n cuts and n+1 strip regions, where n is a number selected from 2, 3, 4, 5, 6, 7, 8, 9, 10 or 11, preferably a number selected from 3, 4 or 5, for example 4.

In preferred filling bodies according to the invention, the cut defines a first cut edge and a second cut edge, which transition into one another at a first and a second cut end of the cut. A portion of one cut edge is spaced from the other cut edge of the same cut. This distance can be adjusted as desired and in a targeted manner by designing the press-and-cutting tools used in the production process accordingly. The further the press-and-cutting tools engage with one another, the greater the distance. Preferably, the distance between one point of one cut edge and the corresponding point of the other cut edge is at least $1/8$, preferably at least $1/6$ of the cut edge length. Corresponding points of both cut edges are the points of the flat material that were immediately adjacent to one another before the cutting and shaping in the press-and-cutting tool. The cut edge length is the length of one of the two cut edges of equal length.

If the filling body has at least two cuts, two cut edges of adjacent cuts can delimit the strip region, and the cut edges delimiting the strip region run parallel to one another. The strip region then has the same width everywhere. Cut edges running "parallel to one another" does not mean that the cut edges are straight on the whole, but that the course of both cut edges can be approximated by a straight line at any point of the particular cut edge where the straight line is tangent to the cut edge. Corresponding straight lines of both cut edges are then parallel to one another.

Preferably, the two other cut edges of the adjacent cuts also run parallel to one another.

The two cut edges of a cut preferably do not run parallel to one another.

It is also preferred when the two cut edges of the same cut lie in a plane obtainable by parallel shifting of a curve. Preferably, the two cut edges of the same cut lie in one plane.

Filling bodies according to the invention with parallel cut edges and/or in which the two cut edges of the same cut lie in one plane can be manufactured particularly economically in terms of cost, because the press-and-cutting tools can then have conventional clamped metal plates of uniform thickness. FIGS. 3A and 3B show press-and-cutting tools in which such metal plates are clamped with threaded rods. Since the cutting edges of both press-and-cutting tools that slide along against one another are edges of flat metal plates, the two cut edges of a resulting cut are necessarily in one plane. Preferably, all cut edges of all cuts of the filling body are in parallel planes.

The fibre-reinforced carbon flat material (2) may, for example, have fibres selected from glass fibres, basalt fibres and carbon fibres, preferably from carbon fibres. Carbon-fibre-reinforced carbon flat materials are particularly preferred fibre-reinforced carbon flat materials according to the invention.

The fibre-reinforced carbon flat material may comprise at least one unidirectional region where the fibres do not cross. It may comprise at least two unidirectional strip regions adjacent to both cut edges of the same cut. Preferably, the fibres in the regions adjacent to the two cut edges of the cut each run parallel to the cut edge. With such a filling body, the cut can be formed substantially without cutting through fibres. The cut then runs between the fibres. This results in particularly little wear on the press-and-cutting tools, as they cut substantially only through matrix material. The filling body can therefore be produced even more effectively.

A unidirectional strip region can extend from one cut edge of the strip region to the other cut edge of the same strip region and from the first cut ends of the two cuts adjacent to the strip region to the second cut ends of the two cuts adjacent to the strip region.

The unidirectional region preferably extends over the entire carbon flat material.

As an alternative or in addition to one or more unidirectional regions, the fibre-reinforced carbon flat material may comprise at least one multidirectional region where the fibres cross. In this region, the fibre-reinforced carbon flat material may comprise a multidirectional laid fibre fabric, a woven fibre fabric, or a non-woven fibre fabric. For example, connecting regions can include multidirectional regions. This has the advantage that the connecting regions are even more stable and the filling bodies can withstand even higher mechanical loads. Nevertheless, it is then possible to form the cuts without having to cut fully through fibres.

The invention also relates to a column having an unstructured packing comprising filling bodies according to the invention. The column has the unstructured packing. Unstructured means that the filling body is randomly oriented in the packing, for example as is the case when the filling bodies are poured into the column or into regions of the column. The packing comprises filling bodies according to the invention. They can be present in a mixture with other filling bodies or catalytically active bodies (for example shaped catalyst bodies or shaped carrier bodies coated with a catalytically active compound). The packing may also consist only of filling bodies according to the invention in certain portions or over the entire packing.

The invention also relates to a method for producing a filling body according to the invention, wherein a fibre-reinforced starting flat material is fed into a press-and-cutting zone, and the starting flat material is shaped, cut to size and cut through in the press-and-cutting zone so as to form a body which comprises a fibre-reinforced flat material and in which two strip regions of the flat material separated by a cut transition into one another in two connecting regions of the flat material.

In a variant of the method according to the invention, the fibre-reinforced starting flat material is already completely or partially carbonised. The fibre-reinforced starting flat material can therefore be a fibre-reinforced carbon flat material, for example a carbon fibre-reinforced carbon flat material.

In another variant of the method according to the invention, non-carbonised matrix components and/or non-carbonised fibre components are present in the fibre-reinforced starting flat material. Non-carbonised matrix components may include a resin, which may be uncured, partially cured or fully cured, a thermoplastic, pitch, or mixtures thereof. Non-carbonised fibre components may include polymer-based fibres, such as in particular aramid, cellulose and/or plastics fibres. Suitable carbonisable starting fibres and carbonisable matrix substances are described in "Carbonfasern und ihre Verbundwerkstoffe, Herstellungsprozesse, Anwendungen und Marktentwicklung" ("Carbon fibres and their composites, manufacturing processes, applications and market development") by Hubert Jager and Tilo Hauke (Verlag Moderne Industrie, 2010, ISBN 978-3-86236-001-7). In this method variant, the body formed in the press-and-cutting zone is subjected to carbonisation, in which the body is converted into the filling body according to the invention. The carbonisation is preferably carried out under the exclusion of oxygen and at elevated temperatures, which can be in the range of 300 to 3000° C., for example. A person skilled in the art selects the temperature depending on which matrix and/or fibre substance is to be carbonised and depending on the desired properties of the filling body.

The invention also relates to the use of filling bodies according to the invention or a column according to the invention for the processing of fluids containing sour gas, such as fluids containing hydrogen halide and/or fluids containing halogen, such as fluids containing chlorine gas.

BRIEF DESCRIPTION OF THE FIGURES

The invention will be explained by the following figures and embodiment, without being limited thereto.

DETAILED DESCRIPTION

Figure 1A:
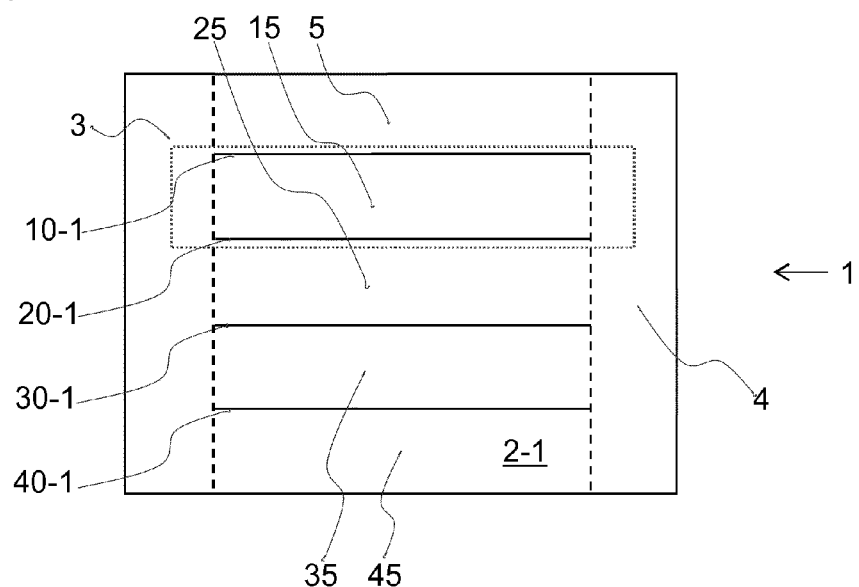
FIG. 1A shows a filling body according to the invention with two connecting regions in different perspectives.
Figure 1B:
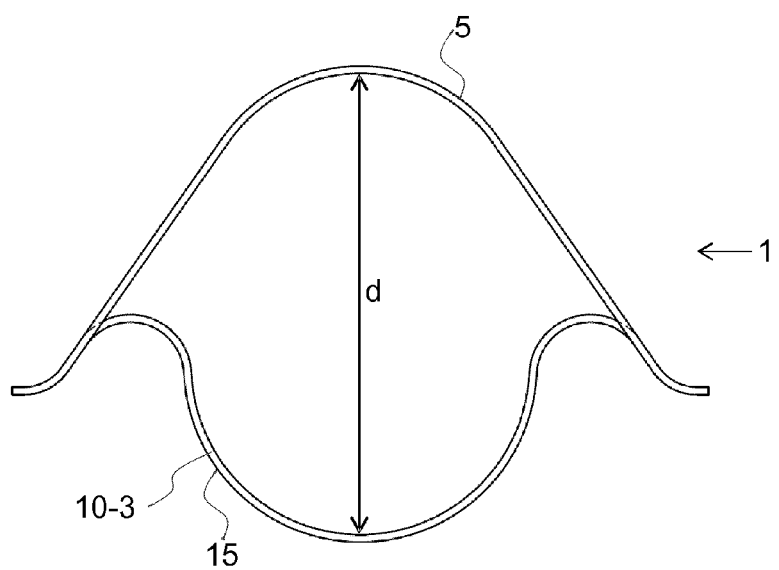
FIG. 1B shows a filling body according to the invention with two connecting regions in different perspectives.
Figure 1C:
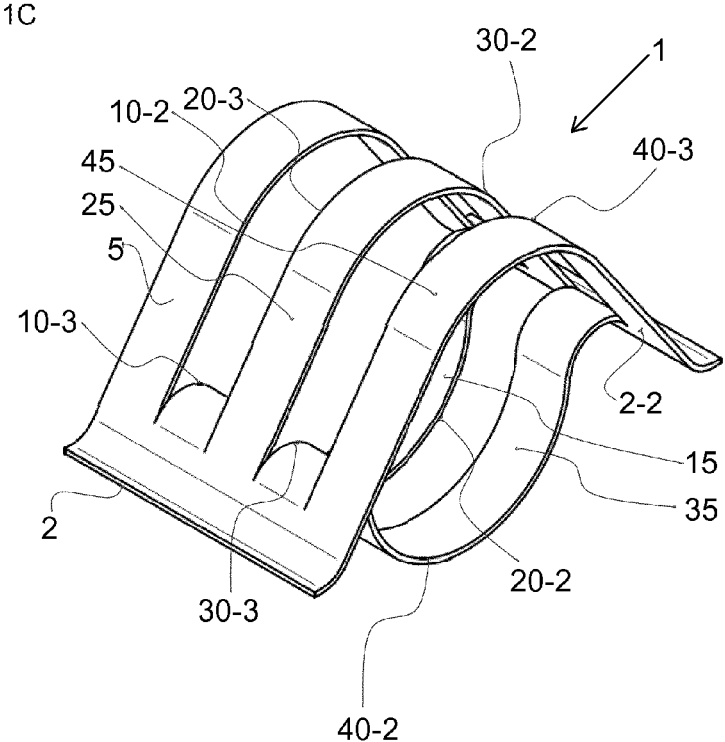
FIG. 1C shows a filling body according to the invention with two connecting regions in different perspectives.

FIGS. 1A, 1B and 1C show a filling body 1 for a column. The filling body comprises a fibre-reinforced carbon flat material 2. Two strip regions 5, 15 of the carbon flat material 2, separated by a cut 10-1, transition into one another in two connecting regions 3, 4 of the carbon flat material. In FIG. 1A, the transition from the strip regions to the connecting regions is indicated by dashed lines. In the embodiment shown in the figures, there are a total of four cuts 10-1, 20-1, 30-1, 40-1, which run in parallel. Therefore, there are a total of five separate strip regions 5, 15, 25, 35, 45 (n cuts and n+1 strip regions, with n being 4).

Figure 2:
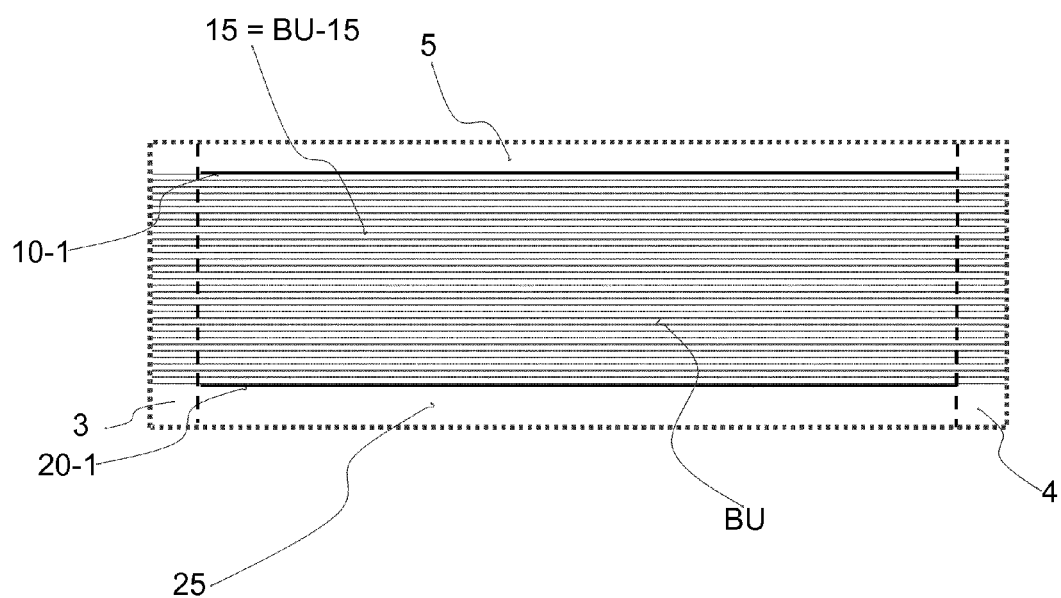
FIG. 2 shows an enlarged detail of the filling body according to the invention, which is indicated by a rectangle in FIG. 1A.

A part of the fibres (preferably carbon fibres) running in each strip region 5, 15, 25, 35, 45 extends into both connecting regions 3, 4. This is shown in FIG. 2 by way of example for an enlarged detail of FIG. 1A around the strip region 15. The fibres in the strip region 15 extending from the connecting region 3 to the connecting region 4 are shown as thin straight lines in FIG. 2. When looking at the filling body 1 from the outside, the fibres are not visible or not visible in their full length, because they are at least partially in the carbon matrix of the carbon flat material. FIG. 2 indicates the fibre orientation within the matrix.

The cuts 10-1, 20-1, 30-1, 40-1 shown in FIG. 1A each define a first cut edge 10-2, 20-2, 30-2, 40-2 shown in FIG. 1B and a second cut edge 10-3, 20-3, 30-3, 40-3 shown in FIG. 1B. At the two cut ends of the cuts 10-1, 20-1, 30-1, 40-1, the two cut edges of each cut transition into one another, which can be clearly seen in the three perspectives of FIGS. 1A, 1B and 1C. In the perspective of FIG. 1B, the strip region 5 covers the two strip regions 25, 45, and the strip region 15 covers the strip region 35. The strip region 5 also covers the cut edge 10-2, with a double arrow d in FIG. 1B indicating that a portion of this cut edge 10-2 is spaced from the other cut edge 10-3 of the same cut 10-1.

In the case of the filling body according to the invention shown in FIG. 1A to 1C, two cut edges (10-3 and 20-2; 20-3 and 30-2; 30-3 and 40-2) of adjacent cuts (10-1 and 20-1; 20-1 and 30-1; 20-1 and 30-1) in each case delimit a strip region (15, 25, 35). The cut edges (10-3 and 20-2; 20-3 and 30-2; 30-3 and 40-2) which delimit a particular strip region (15, 25, 35) run parallel to one another in pairs.

The two other cut edges (10-2 and 20-3; 20-2 and 30-3; 30-2 and 40-3) of the adjacent cuts (10-1 and 20-1; 20-1 and 30-1; 20-1 and 30-1) also run parallel to one another in pairs.

From the perspective of FIG. 1A, it can be clearly seen that the two cut edges (10-2 and 10-3; 20-2 and 20-3; 30-2 and 30-3; 40-2 and 40-3) of the same cut (10-1; 20-1; 30-1; 40-1) lie in one plane. Here, the planes run towards the viewer. Therefore, the cut edges lying in the planes each appear as a straight line portion that coincides with the corresponding cut.

In the region indicated by straight lines in FIG. 2, the carbon fibres do not cross. This region is therefore a unidirectional region BU of the fibre-reinforced carbon flat material 2. The figures do not show that the fibres embedded in the other strip regions also run parallel and up to the connecting regions 3 and 4. The fibre-reinforced carbon flat material 2 thus comprises a number of pairs of unidirectional strip regions (BU-5 and BU-15; BU-15 and BU-25; BU-25 and BU-35; BU-35 and BU-45), each of which is adjacent to the two cut edges (10-2 and 10-3; 20-2 and 20-3; 30-2 and 30-3; 40-2 and 40-3) of the same cut (10-1; 20-1; 30-1; 40-1).

FIGS. 1A and 2 show that the unidirectional strip region BU-15 occupies the entire area of the strip region 15. The unidirectional strip region BU-15 extends from one cut edge 10-3 of the strip region 15 to the other cut edge 20-2 of the same strip region 15 and from the first cut ends of the two cuts 10-1, 20-1 to the second cut ends of the two cuts 10-1, 20-1. As an example, the unidirectional region BU can extend over the entire carbon flat material.

What is not shown in the figures is that the fibre-reinforced carbon flat material 2 can include at least one multidirectional region where the fibres cross.

Figure 3A:
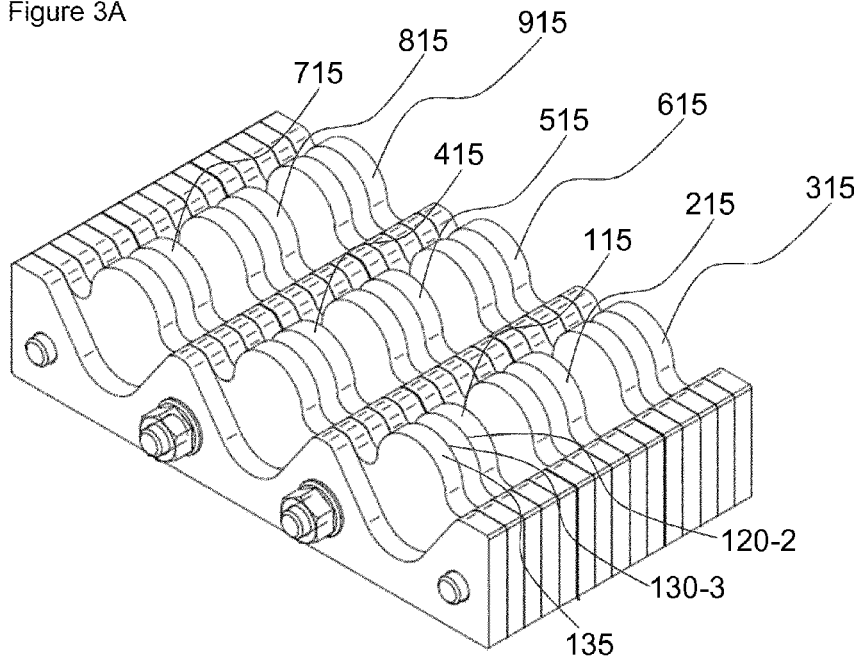
FIG. 3A shows press-and-cutting tools engaging with one another to produce the filling body shown in FIGS. 1A, 1B, 1C and 2.
Figure 3B:
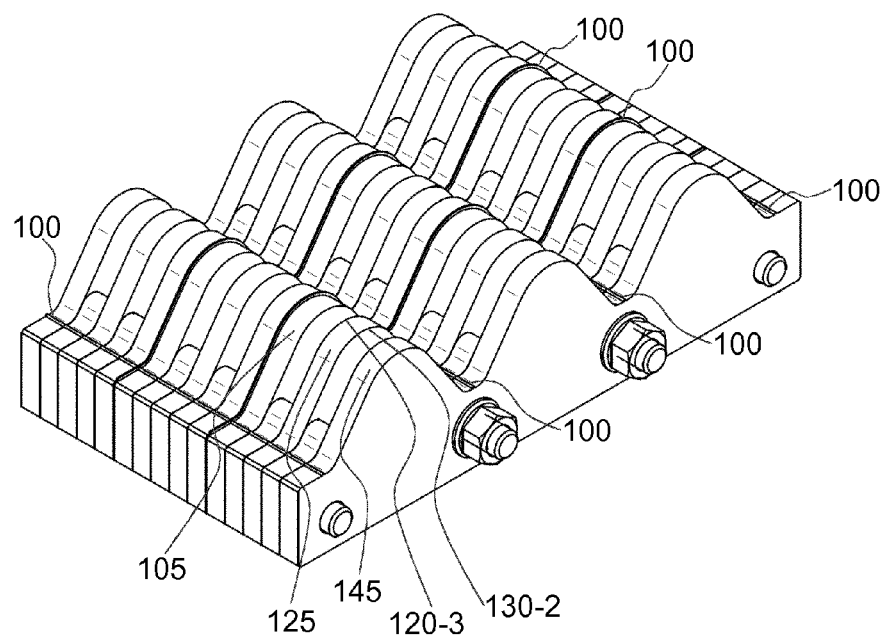
FIG. 3B shows press-and-cutting tools engaging with one another to produce the filling body shown in FIGS. 1A, 1B, 1C and 2.
Figure 4:
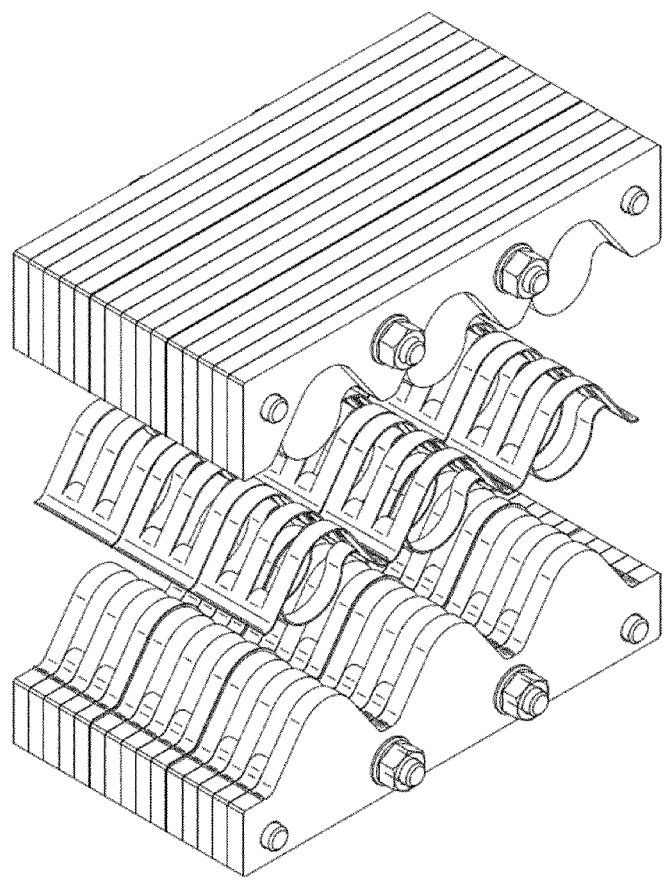
FIG. 4 shows the press-and-cutting tools of FIGS. 3A and 3B arranged one above the other with fibre-reinforced flat material that has been cut through and cut to size so as to form filling body green bodies.

The press-and-cutting tools shown in FIGS. 3A and 3B can be used in a method according to the invention to produce the filling body shown. According to the method, a starting flat material comprising fibres and a carbonisable matrix substance is fed into a press-and-cutting zone. In the press-and-cutting zone, the press-and-cutting tool shown in FIG. 3A forms an upper counterpart to the lower press-and-cutting tool shown in FIG. 3B; as shown in FIG. 4. In the press-and-cutting zone, the starting flat material between the tools shown in FIGS. 3A and 3B is cut through and cut to size and thus converted into filling body green bodies. The filling body green bodies can be converted into filling bodies according to the invention by carbonisation.

The press-and-cutting tools shown here as an example each comprise 9 (3×3) sub-regions, with portion-cutting edges 100 running on the lower press-and-cutting tool at the transitions between the sub-regions. The portion-cutting edges 100 cut through the fibre-reinforced flat material in the longitudinal and transverse direction in such a way that 9 cut filling body green bodies are obtained with the desired cut.

Each of the 9 sub-regions comprises planar, parallel cutting projections and parallel cutting projection receptacles arranged in between, which receive the cutting projections of the other press-and-cutting tool during the press-and-cutting process. The strip regions 5, 15, 25, 35, 45 come to rest on the surfaces (see for example 105, 125 and 145 in the first sub-region in FIGS. 3B and 115 and 135 in the first sub-region in FIG. 3A) of the cutting projections. The cuts 10-1, 20-1, 30-1, 40-1 each result from the fact that the planar cutting projections penetrate into the cutting projection receptacles of the other cutting tool. In this case, two through-cutting edges (for example 120-2 and 120-3, and 130-2 and 130-3) slide along each other and thus force the formation of the corresponding cuts (cuts 20-1 and 30-1 for the through-cutting edges 120-2, 120-3, 130-2, 130-3 mentioned here and denoted by reference signs in FIGS. 3A and 3B).

It is also possible to use press-and-cutting tools that do not comprise 3×3 sub-regions, but rather larger or smaller numbers of sub-regions, for example only one sub-region.

Figure 5:
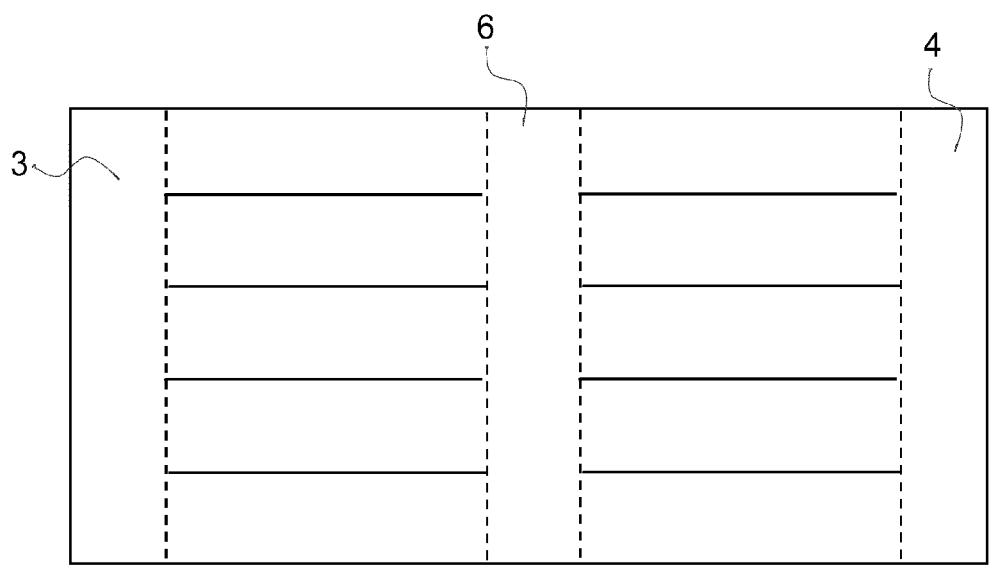
FIG. 5 shows a filling body according to the invention with three connecting regions.

FIG. 5 shows a filling body according to the invention with 3 connecting regions 3, 4 and 6. Only the perspective of FIG. 1A is shown.

For reasons of clarity, only selected reference signs have been shown in the figures.

LIST OF REFERENCE SIGNS

Filling body 1
Carbon flat material 2
First main surface 2-1
Second main surface 2-2
Connecting region 3, 4, 6
Strip region 5, 15, 25, 35, 45
Cut 10-1, 20-1, 30-1, 40-1
First cut edge 10-2, 20-2, 30-2, 40-2
Second cut edge 10-3, 20-3, 30-3, 40-3
Unidirectional region BU
Unidirectional strip region BU-5, BU-15
Portion-cutting edge 100
Through-cutting edge 120-2, 120-3, 130-2, 130-3
Surfaces 105, 115, 125, 135, 145

The invention claimed is:

1. A filling body for use in unstructured packings, comprising: a fibre-reinforced carbon flat material, and two strip regions of the carbon flat material, which are separated by a cut, and transition into one another in two connecting regions of the carbon flat material; the two strip regions forming an alternating pair of strip regions;
   wherein one of the two strip regions of the alternating pair of strip regions is separated by the cut and forms a single hump; and
   wherein another one of the two strip regions of the alternating pair of strip regions forms a U shape, each end of the U shape comprising a hump; and
   wherein the filling body comprises a total of n cuts, resulting in an alternating arrangement of a plurality of adjacent alternating pairs of strip regions, and n is a number ranging from 4 to 35.

2. The filling body according to claim 1, wherein at least some of the fibres running in at least one strip region extend into both connecting regions.

3. The filling body according to claim 1, comprising
   n cuts and
   n+1 strip regions,
   wherein n is a number selected from 5, 6, 7, 8, 9, 10 or 11.

4. The filling body according to claim 1, wherein the cut defines a first cut edge and a second cut edge, which transition into one another at a first and a second cut end of the cut, and a portion of one cut edge is spaced apart from the other cut edge of the same cut.

5. The filling body according to claim 1, wherein two cut edges of adjacent cuts delimit a given strip region, and the cut edges delimiting the given strip region run parallel to one another.

6. The filling body according to claim 5, wherein the two other cut edges of the adjacent cuts also run parallel to one another.

7. The filling body according to claim 1, wherein both cut edges of the same cut lie in one plane.

8. The filling body according to claim 1, wherein the fibre-reinforced carbon flat material comprises fibres selected from glass fibres, basalt fibres and carbon fibres.

9. The filling body according to claim 1, wherein the fibre-reinforced carbon flat material comprises at least one unidirectional region in which the fibres do not cross.

10. The filling body according to claim 9, wherein the fibre-reinforced carbon flat material comprises at least two unidirectional strip regions adjacent to both cut edges of the same cut.

11. The filling body according to claim 9, wherein a unidirectional strip region extends from one cut edge of a given strip region to the other cut edge of the same strip region and from the first cut ends of the two cuts to the second cut ends of the two cuts.

12. The filling body according to claim 9, wherein the unidirectional region extends over the entire carbon flat material.

13. The filling body according to claim 1, wherein the fibre-reinforced carbon flat material comprises at least one multidirectional region in which the fibres cross.

14. A column having an unstructured packing comprising filling bodies according to claim 1.

15. A method for producing a filling body according to claim 1, wherein a fibre-reinforced starting flat material is fed into a press-and-cutting zone, and the starting flat material is shaped, cut up and cut through in the press-and-cutting zone so as to form a body which comprises a fibre-reinforced flat material and in which two strip regions of the flat material separated by a cut transition into one another in two connecting regions of the flat material.

16. The filling body according to claim 1, wherein each of the two strip regions separated by the cut is configured in a curved shape, the other one of the two strip regions comprises two more turning points compared to the one of the two strip regions.

17. The filling body according to claim 1, wherein the cut defines a first cut edge and a second cut edge, a distance between one point of the first cut edge and a corresponding point of the second cut edge is at least 1/6 of a length of each cut edge, wherein the one point and the corresponding point are immediately adjacent to one another before cutting the carbon flat material.

18. The filling body according to claim 1, wherein all cuts have equal lengths.

\* \* \* \* \*